US007627777B2

(12) United States Patent
Najork

(10) Patent No.: US 7,627,777 B2
(45) Date of Patent: Dec. 1, 2009

(54) FAULT TOLERANCE SCHEME FOR DISTRIBUTED HYPERLINK DATABASE

(75) Inventor: Marc Alexander Najork, Palo Alto, CA (US)

(73) Assignee: Microsoft Corporation, Redmond, WA (US)

(*) Notice: Subject to any disclaimer, the term of this patent is extended or adjusted under 35 U.S.C. 154(b) by 413 days.

(21) Appl. No.: 11/378,930

(22) Filed: Mar. 17, 2006

(65) Prior Publication Data

US 2007/0220064 A1 Sep. 20, 2007

(51) Int. Cl.
G06F 11/00 (2006.01)
(52) U.S. Cl. .......................................................... 714/7
(58) Field of Classification Search ....................... 714/7
See application file for complete search history.

(56) References Cited

U.S. PATENT DOCUMENTS

| | | | |
|---|---|---|---|
| 3,109,186 A | 11/1963 | Glenn | |
| 3,142,485 A | 7/1964 | Jacobsen | |
| 3,424,133 A | 1/1969 | Brady | |
| 3,517,930 A | 6/1970 | Jacobsen | |
| 3,786,526 A | 1/1974 | Ausseil | |
| 4,411,422 A | 10/1983 | Solloway | |
| 4,416,451 A | 11/1983 | Solloway | |
| 4,565,369 A | 1/1986 | Bedgood | |
| 4,721,300 A | 1/1988 | Guzman | |
| 5,011,137 A | 4/1991 | Murphy | |
| 5,031,904 A | 7/1991 | Solloway | |
| 5,183,424 A | 2/1993 | Field | |
| 5,326,296 A | 7/1994 | De Jesus | |
| 6,098,081 A | 8/2000 | Heidorn et al. | |
| 6,112,203 A | 8/2000 | Bharat et al. | 707/5 |
| 6,301,614 B1 | 10/2001 | Najork et al. | 709/223 |
| 6,505,191 B1 | 1/2003 | Baclawski | 707/3 |
| 6,601,066 B1 | 7/2003 | Davis-Hall | 707/5 |
| 7,032,168 B1 | 4/2006 | Gerace et al. | |
| 7,158,926 B2 | 1/2007 | Kampe | |
| 2001/0011335 A1* | 8/2001 | Matthews et al. | 711/159 |
| 2002/0103824 A1 | 8/2002 | Koppolu et al. | |
| 2002/0133697 A1 | 9/2002 | Royer et al. | 713/150 |
| 2005/0256860 A1 | 11/2005 | Eiron et al. | |
| 2007/0136279 A1* | 6/2007 | Zhou et al. | 707/6 |

OTHER PUBLICATIONS

Veritas Volume Manager 3.5, Aug. 2002, Veritas Software Corporation, pp. 247-258.*
Adler, M. et al., "Towards Compressing Web Graphs", *CMPSCI Technical Report*, 2000, 5 pages.
Arasu, A. et al., "PageRank Computation and the Structure of the Web: Experiments and Algorithms", *Technical Report, IBM Almaden Research Center*, Nov. 2001, 3 pages.
Bharat, K. et al., "Improved Algorithms for Topic Distillation in a Hyperlinked Environment", $21^{st}$ *ACM SIGIR Conference on Research and Development in Information Retrieval*, 1998, 5 pages.

(Continued)

*Primary Examiner*—Scott T Baderman
*Assistant Examiner*—Jigar Patel
(74) *Attorney, Agent, or Firm*—Woodcock Washburn LLP

(57) ABSTRACT

Fault tolerance is provided for a database of hyperlinks distributed across multiple machines, such as a scalable hyperlink store. The fault tolerance enables the distributed database to continue operating, with brief interruptions, even when some of the machines in the cluster have failed. A primary database is provided for normal operation, and a secondary database is provided for operation in the presence of failures.

20 Claims, 6 Drawing Sheets

OTHER PUBLICATIONS

Bharat, K. et al., "The Connectivity Server: fast access to linkage information on the Web", *Computer Networks and ISDN Systems*, 1998, 30, 469-477.

Brin, S. et al., "The Anatomy of a large-scale hypertextual Web search engine", *computer Networks and ISDN Systems*, 1998, 30, 107-117.

Chen, Y-Y. et al., "I/O-Efficient Techniques for Computing Pagerank", *CIKM*, 2002, 5 pages.

Cormen, T.H. et al., "Introduction to Algorithms", *MIT Press/McGraw-Hill*, 1990, 337-344.

Ding, C. et al., "PageRank, HITS and a Unified Framework for Link Analysis", *Lawrence Berkeley National Laboratory*, Nov. 2001, 1-12.

Haveliwala, T. H. et al., "Efficient Computation of PageRank", Oct. 18, 1999, 1-15.

Kleinberg, J.M. "Authoritative Sources in a Hyperlinked Environment", *Proceedings of the ACM-SIAM Symposium on Discrete Algorithms*, 1998, 1-31.

Lempel, R. et al., "The Stochastic Approach for Link-Structure Analysis (SALSA) and the TKC Effect", *Department of Computer Science, The Technion*, 1-39.

"The PageRank Citation Ranking: Bringing Order to the Web", Jan. 29, 1998, 1-17.

Randall, K.H. et al., "The Link Database: Fast Access to Graphs of the Web", *SRC Research Report*, www.research.compaq.com/SRC, Nov. 16, 2001, 1-16.

Suel, T. et al., "Compressing the Graph Structure of the Web", pp. 1-10.

In the United States Patent and Trademark Office, Final Office Action In re: U.S. Appl. No. 11/512,887, filed Aug. 29, 2006, dated Jul. 16, 2009, 11 pages.

In the United States Patent and Trademark Office, Non-Final Office Action in re: U.S. Appl. No. 11/512,887, filed Aug. 29, 2006, dated Feb. 4, 2009, 20 pages.

In the United States Patent and Trademark Office, Corrected Notice of Allowance in re: U.S. Appl. No. 10/413,645, filed Apr. 15, 2003, dated Dec. 13, 2007, 19 pages.

In the United States Patent and Trademark Office, Notice of Allowance in re: U.S. Appl. No. 10/413,645, filed Apr. 15, 2003, dated Oct. 8, 2007, 20 pages.

In the United States Patent and Trademark Office, Final Office Action in re: U.S. Appl. No. 10/413,645, filed Apr. 15, 2003, dated Feb. 1, 2007, 17 pages.

In the United States Patent and Trademark Office, Non-Final Office in re: U.S. Appl. No. 10/413,645, filed Apr. 15, 2003, dated Aug. 18, 2007, 16 pages.

In the United States Patent and Trademark Office, Final Office Action in re: U.S. Appl. No. 10/413,645, filed Apr. 15, 2003, dated Feb. 2, 2006, 18 pages.

In the United States Patent and Trademark Office, Non-Final Office in re: U.S. Appl. No. 10/413,645, filed Apr. 15, 2003, dated Oct. 5, 2005, 16 pages.

\* cited by examiner

FAULT TOLERANCE SCHEME FOR DISTRIBUTED HYPERLINK DATABASE

BACKGROUND

Web search services allow users to submit queries, and in response, they return a set of links to web pages that satisfy the query. Because a query may potentially produce a large number of results, search engines typically display the results in a ranked order. There are many ways to rank-order the links resulting from a query, including content-based ranking, usage-based ranking, and link-based ranking. Content-based ranking techniques determine how relevant the content of a document is to a particular query. Usage-based ranking techniques monitor which result links users actually follow, and boost the rank of these result links for subsequent queries. Link-based ranking techniques examine how many other web pages link to a particular web page, and assign higher ranks to pages with many incoming links. Examples of link-based ranking algorithms include PageRank, HITS, and SALSA.

Link-based ranking algorithms view each page on the web as a node in a graph, and each hyperlink from one page to the other as a directed edge between the two corresponding nodes in the graph. There are two variants of link-based ranking algorithms: query-independent ones (such as PageRank) that assign an importance score (independent of any particular query) to all the web pages in the graph, and query-dependent ones (such as HITS and SALSA) that assign a relevance score with respect to a particular query to each web page returned in the result set of a query. Query-independent scores can be computed prior to the arrival of any query, while query-dependent scores, by their very nature, can only be computed once the query has been received.

Users expect to receive answers to a query within a few seconds, and all major search engines strive to provide results in less than one second. Therefore, any query-dependent ranking algorithm desirably has to compute scores for all pages in the result set in under one second, and ideally within less than 100 milliseconds. However, the seek time of modern hard disks is on the order of 10 milliseconds, making them too slow to be used as a medium to store the web graph. In order to meet the time constraints, the web graph (or at least the most frequently used portions of it) has to be stored in memory, such as RAM, as opposed to disk storage.

A graph induced by the web pages stored in the corpus of a major search engine is extremely large. For example, the MSN Search corpus contains 5 billion web pages, which in turn contain on the order of 100 billion hyperlinks; the Google corpus is believed to contain about 20 billion web pages containing on the order of 400 billion hyperlinks. A web graph of this size cannot be stored in the memory of a single machine, even if the most effective compression techniques are applied. Therefore, the graph is distributed ("partitioned") across multiple machines. Distributing the graph is orthogonal to compressing it; in practice, one does both.

U.S. patent application Ser. No. 10/413,645, filed Apr. 15, 2003, entitled "System and method for maintaining a distributed database of hyperlinks", and incorporated herein by reference in its entirety, describes a scheme for distributing a database of hyperlinks across multiple machines, such as database processors. An embodiment is referred to as the Scalable Hyperlink Store, or SHS.

SHS represents a web graph as three databases or "stores": a uniform resource locator (URL) store, a forward link store, and a backward link store. Each store is partitioned across multiple machines; each machine will hold corresponding fractions ("partitions") of each store in main memory to serve queries. The role and the layout of the stores as well as the partitioning algorithm are described in more detail herein.

Computers may fail for a variety of reasons, such as the failure of a hardware component (e.g., disk drives, power supplies, processors, memory, etc). Distributed systems composed of multiple computers are more vulnerable to failure: in a distributed system of n computers, where each individual computer fails with probability p during a given time interval, the probability that at least one of the constituent computers has failed is $1-(1-p)^n$, which is greater than p and increases with increasing n. Therefore, distributed systems should be designed to be fault-tolerant; that is, they should continue to function even if one or more of their constituent elements have failed.

SUMMARY

Fault tolerance is provided for a database of hyperlinks distributed across multiple machines, such as a scalable hyperlink store. The fault tolerance enables the distributed database to continue operating (with brief interruptions) even when some of the machines in the cluster have failed. A primary database is provided for normal operation, and a secondary database is provided for operation in the presence of failures.

For example, a failure may be detected in at least one machine in the cluster of machines. The surviving machines may be notified about the failure. Primary store partitions are then evicted from the memory of each of the surviving machines, and secondary store partitions are loaded into the memory of a subset of the surviving machines. Service may then resume in degraded mode using the secondary store partitions. Clients may be notified about the failure, and may abort any unfinished transactions.

A spare machine may be provided to replace each failed machine. Replicas of the primary store partitions that resided on the failed machines are copied from the disk storage of the surviving machines to the spare machines. The secondary store partitions are then evicted from the memory of the surviving machines, and the primary store partitions are loaded into the memory of the surviving and spare machines. Service may then resume in non-degraded mode.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In a distributed database for maintaining hyperlinks, web pages are identified by uniform resource locators (URLs). A typical URL is of the form http://xyz.com/a/b, where xyz.com (the "host" of the URL) identifies the web server providing this web page, and /a/b (the "path" of the URL) identifies the page itself (relative to web server xyz.com). The pages in the index of a typical major search engine are drawn from on the order of 50 million hosts. As used herein, host(u) denotes the host of URL u.

Figure 1:
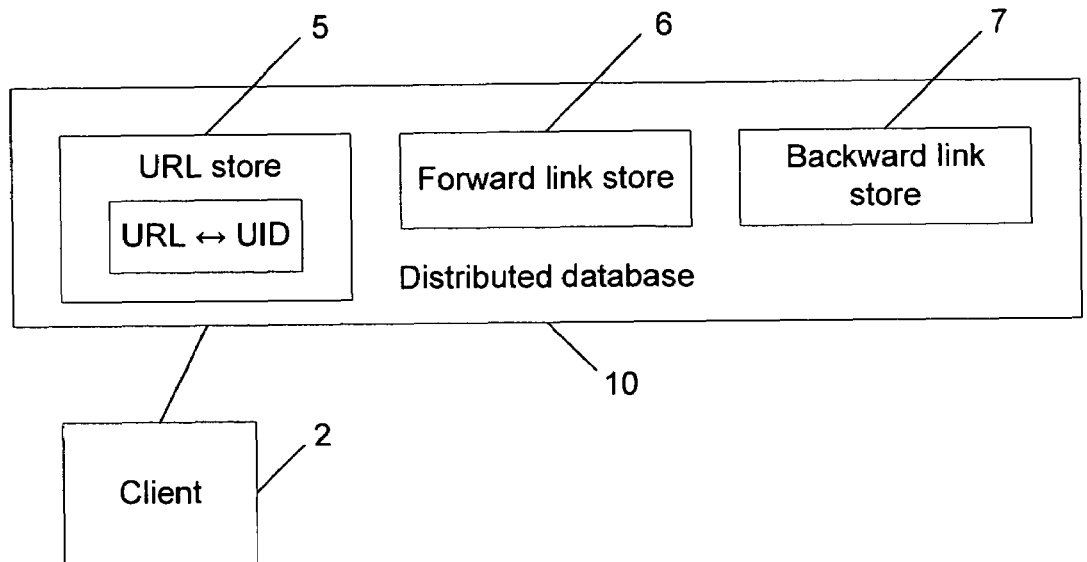
FIG. 1 is a high level block diagram of an example distributed database system.

URLs are on average about 80 characters long. In order to compress the web graph efficiently, a distributed database for maintaining hyperlinks stores hyperlinks not as URLs, but rather as 64-bit integers called unique identifiers (UIDs). FIG. 1 is a high level block diagram of an example distributed database system. There is a one-to-one mapping between URLs and UIDs. This mapping is maintained by a URL store 5 in the distributed database system 10. The URL store 5 provides a method UrlToUid for mapping a URL to its corresponding UID, and a method UidToUrl for mapping a UID back to its corresponding URL.

In addition to the URL store 5, a distributed database system 10 for maintaining hyperlinks maintains a forward link store 6 and a backward link store 7. The forward link store 6 provides a method, GetLinks, which, given a UID (representing a URL), returns a list of the UIDs (representing URLs) that the given UID links to. Similarly, the backward link store 7 provides a method, GetLinks, which, given a UID, returns a list of UIDs that link to the given UID. A client 2 may interact with the servers that are comprised within the database system 10.

Describing the three stores in terms familiar to a mathematician, the URL store contains the node set of the web graph, the forward link store contains the adjacency matrix induced by the edge set, and the backward link store contains the transpose of the adjacency matrix.

Figure 2:
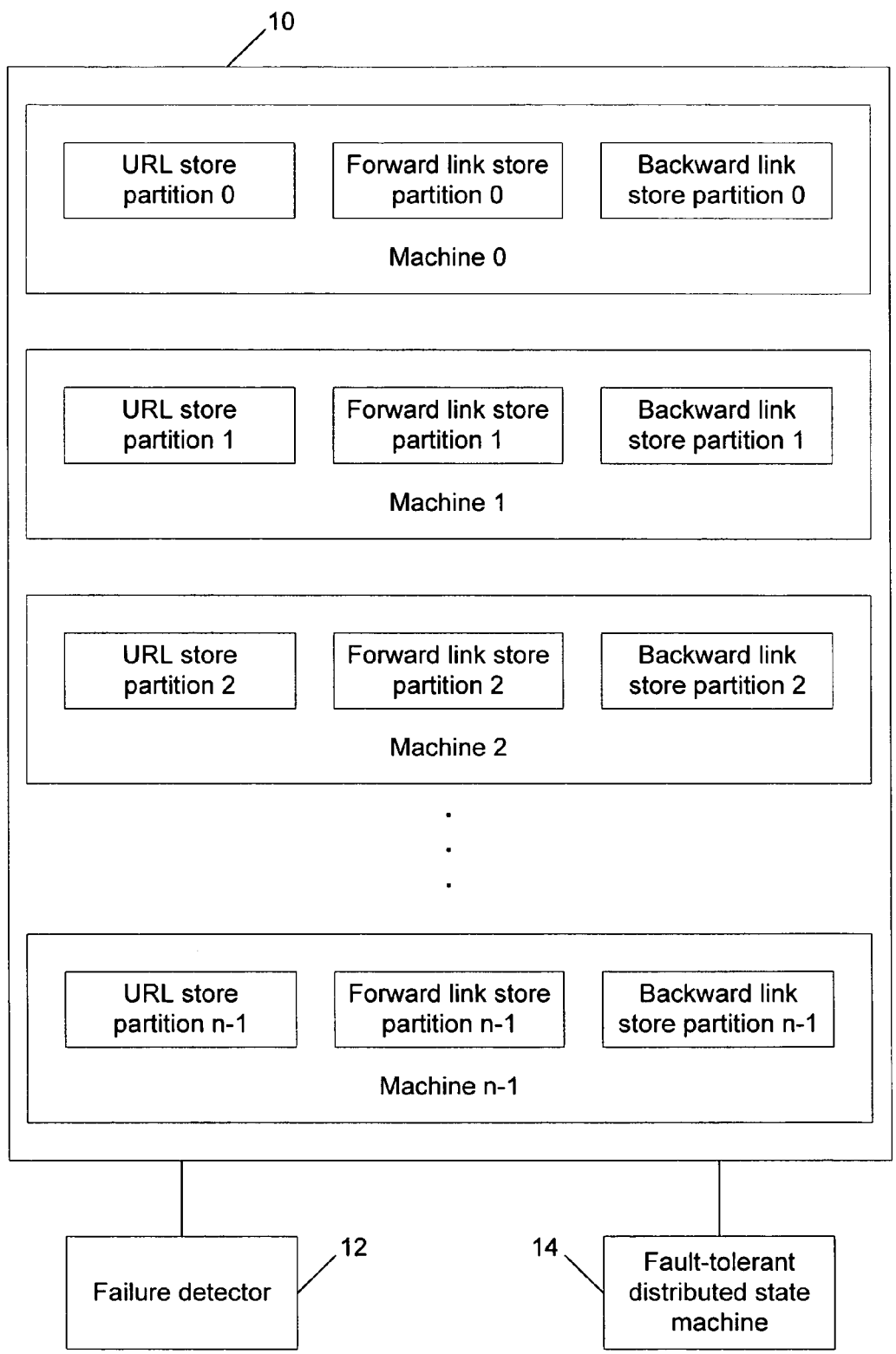
FIG. 2 is a more detailed block diagram of the example system of FIG. 1.

FIG. 2 is a more detailed block diagram of the example system of FIG. 1. A distributed database system 10 running on a cluster of machines, such as servers and/or database processors, for example, connected by a high speed network, is provided, and each of the three stores is partitioned across the machines or servers in the clusters. Assume that the cluster comprises n machines, numbered 0 to n−1. The URL, backward link, and forward link store partitions are numbered accordingly.

The distributed database system uses a hash function $H_1$ mapping host names to the integer range [0 . . . n−1] to place URLs into URL store partitions. A URL u is placed in the URL store partition numbered $H_1$(host(u)). So all URLs belonging to a particular host (web server) are placed in the same URL store partition. Furthermore, a simple hash function application may be used to determine which URL store partition contains a particular URL.

Figure 3:
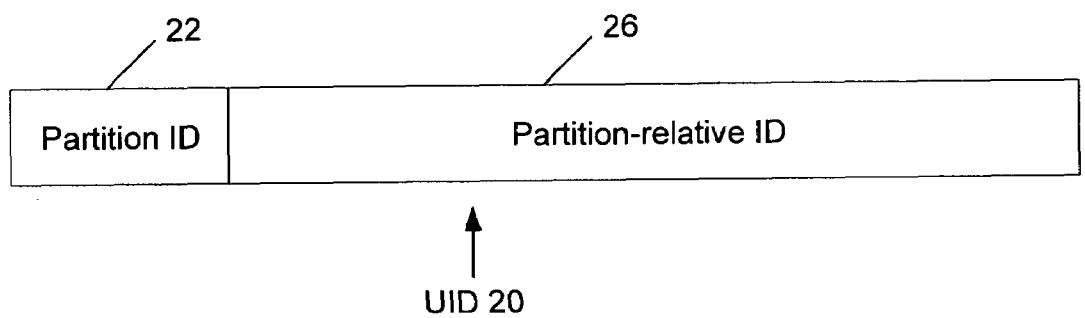
FIG. 3 is a diagram of an example unique identifier (UID) format.

An example UID format is shown in FIG. 3. The most significant few (e.g., 8) bits of a UID 20 encode the identity of the store partition containing the corresponding URL as a partition ID in portion 22. The remaining bits encode a number that is unique relative to that machine as a partition-relative ID in portion 26.

For example, given a URL http://xyz.com/a/b and assuming that $H_1$(xyz.com) is 17, this URL is placed in URL store partition 17 on machine 17 of the cluster of machines, and the highest few bits, corresponding to portion 22 in FIG. 3, of the corresponding UID encode the number 17. So given a UID, it is straightforward to determine the URL store partition that maintains the mapping between this UID and its corresponding URL. In the following, partition(u) is used to denote the partition ID of UID u, and relative(u) is used to denote its partition-relative ID.

The partition-relative ID is drawn from a densely packed space, by sorting all URLs placed in a given URL store partition in lexicographic order and using their position in that ordering as the partition-relative identifier. So all UIDs referring to web pages on the same host desirably occupy a densely populated numeric interval, with no UID referring to a web page on a different host falling into that interval.

As described above, both the forward link store and the backward link store implement mappings from UIDs to lists of UIDs. The forward link store maps a UID u to the list of UIDs linked to by u, and the backward link store maps a UID u to the list of UIDs linking to u. Both stores are partitioned according to the partition ID of u (that is, the UID that is the argument to the mapping). Given a UID u whose partition ID is x, partition x of the forward link store contains the mapping of u to the pages u links to, and partition x of the backward link store contains the mapping of u to the pages linking to u.

Clients of a distributed database system hash the host component of a URL or extract the machine ID of a UID in order to determine which machine in the cluster to contact, and then send their UrlToUid, UidToUrl, or GetLinks requests to the appropriate machine.

There is a possibility that one or more of the machines in the cluster may fail in the course of operation. It is desirable to continue service with a minimum of interruption.

A failure detector 12 is used to detect whether a machine in the cluster has failed, and a fault-tolerant distributed state machine 14 maintains a list of machines in the cluster and which machines, if any, have failed. Failure detectors 12 and distributed state machines 14 are well-known to those skilled in the art. The failure detector 12 and distributed state machine 14 may run on the same machines as the distributed database system or on different machines.

The techniques described herein will tolerate up to f concurrent machine failures (where f may be chosen at database creation time, and is smaller than n, and may be set to 1, 2, or 3, for example). In addition to the hash function $H_1$ described herein, a second hash function $H_2$ is used that maps host names to integers in the range [0 . . . n−1−f]. At database construction time, instead of building a single database comprising the three stores described above, two databases are built, each comprising three stores and both containing the same information, though likely not distributed among the machines identically.

Figure 4:
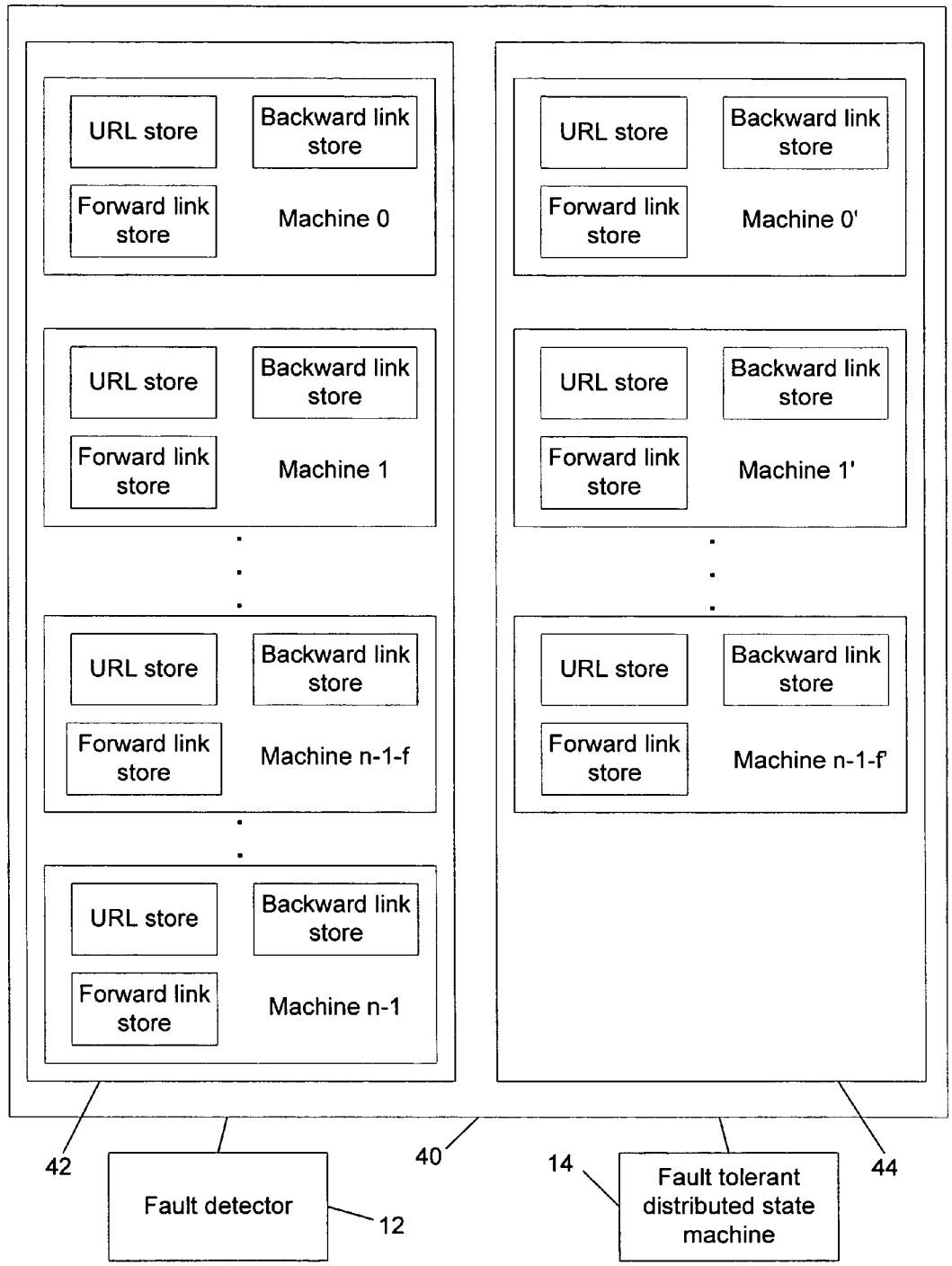
FIG. 4 is a block diagram of another example distributed database system.
Figure 5:
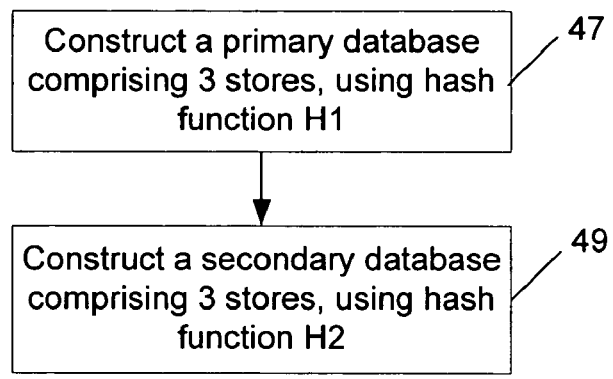
FIG. 5 is a flow diagram of an example database creation method.

An example system 40 is shown in FIG. 4. A primary database 42 is constructed using hash function $H_1$ to place URLs onto machines in the cluster (step 47 in the flow diagram of FIG. 5); a secondary database 44 is constructed using hash function $H_2$ to place URLs onto a subset of the machines in the cluster (namely, machines 0 through n−1−f, represented with a "'" symbol) (step 49). Desirably, the data that is replicated is stored on disk instead of memory (e.g., RAM).

A URL u will have differing UIDs v and v' in the primary and the secondary stores 42, 44, respectively. Partition(v) and partition(v') will typically differ because partition(v)=$H_1$(host(u)) and partition(v')=$H_2$(host(u)), and $H_1$ and $H_2$ are different hash functions. Relative(v) and relative(v') will typically differ as well because the primary URL store partition numbered x will contain different URLs than the secondary URL store partition numbered x, and the position of a URL in a URL store partition corresponds to its partition-relative ID.

Each primary and each secondary store partition is replicated f+1 times (one original and f replicas). Assuming the original store resides on machine k, the f replicas reside on machine (k+1) mod n, (k+2) mod n, ..., (k+f) mod n. Because each store partition resides on f+1 distinct machines, there will be at least one surviving copy of each store partition even if f machines have failed.

During normal operation, the distributed database system operates as before. A client wishing to invoke the UrlToUid method on a URL u computes $H_1(host(u))$ to determine which machine in the distributed database system cluster maintains the URL store containing u, and sends a UrlToUid request to that machine. Similarly, a client wishing to invoke the UidToUrl or the GetLinks method on a UID u extracts the partition ID from u to determine which machine in the cluster maintains the store containing u, and sends the appropriate request to that machine.

In order to describe the distributed database system operation in the event of failures, it is convenient to first make a few auxiliary definitions. Assume that k machines $x_1, x_2, \ldots, x_k$ (with $k \leq f$) have failed. The set $\{x_1, x_2, \ldots, x_k\}$ is referred to as the failed-set F. Define a function f(x) that indicates how many machines with an ID less than x have failed:

$$f(x) = |\{y \in F : y < x\}|.$$

Using this definition, define a function P that maps some machines onto the secondary partitions they are supposed to serve given the failed-set F:

$$P(x) = (x - f(x)) \text{ if } x \notin F \text{ \& } x - f(x) < n; \text{ undefined otherwise}.$$

Additionally, introduce a function M that maps a secondary store partition ID to the machine currently serving that partition. M is the inverse of P, and can be defined as:

$$M(x) = y \text{ such that } |\{z : z \leq y \text{ \& } Z \notin F\}| = x.$$

Figure 6:
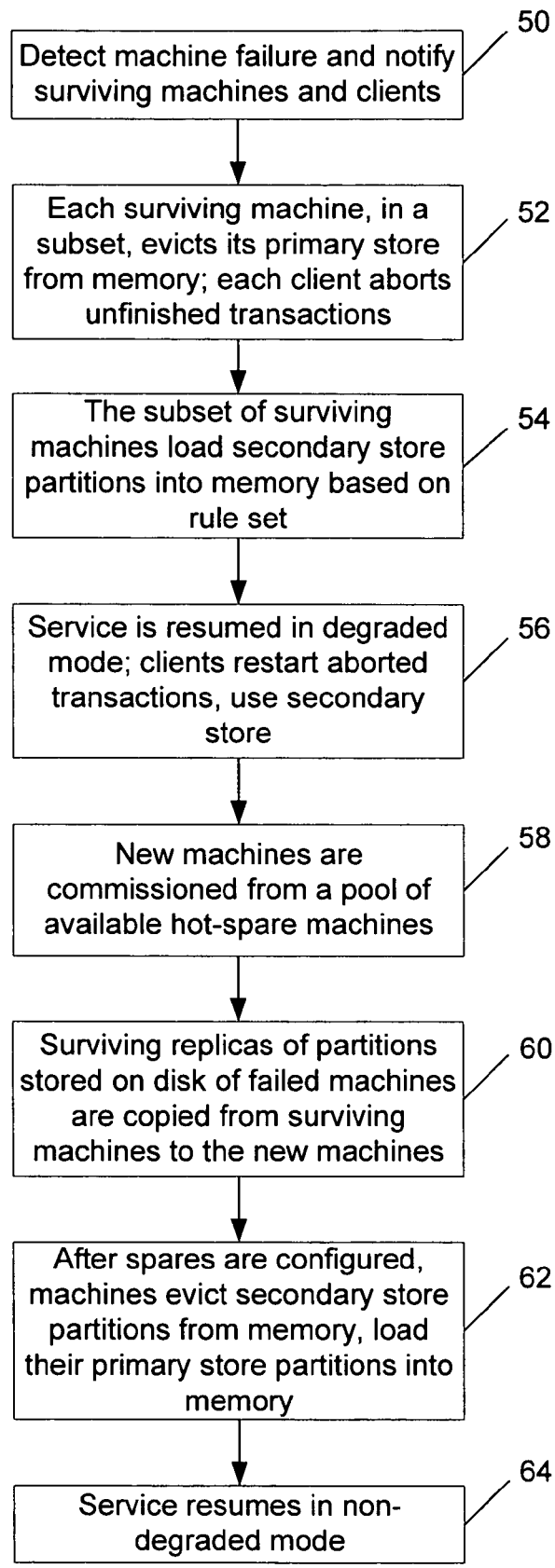
FIG. 6 is a flow diagram of an example fault tolerance method.

The operation in the event of one or more failures is as follows, described with respect to FIG. 6. At step 50, the failure detector detects that k machines $x_1, x_2, \ldots, x_k$ (with $k \leq f$) have failed, and notifies the surviving machines in the cluster and the clients. Each surviving machine, or each machine in a subset n–f of machines, evicts its three primary store partitions from memory (e.g., RAM), at step 52, and each client aborts (and later restarts) any unfinished transactions. This is desirable because the primary and the secondary stores use a different mapping from URLs to UIDs (both the partition ID and the partition-relative offset differ).

At step 54, n–f of the surviving machines load secondary store partitions into memory. Machine x determines which, if any, secondary store partition it should load according to the following rule: If P(x) is defined, machine x evicts the primary store partitions from memory and then loads partitions P(x) of the secondary URL store, forward link store, and backward link store into memory; otherwise, it does nothing and will not be involved in serving requests until the system returns back to normal operation. Service is unavailable during this step.

At this point, at step 56, the system resumes service in "degraded mode", meaning that performance is only (n–f)/n of non-degraded performance. Clients restart any aborted transactions and then issue new requests. Clients consult the secondary, not the primary store. More particularly, for example, a client wishing to invoke the UrlToUid method on a URL u sends the request to machine $M(H_2(host(u)))$, where it can be serviced from the loaded secondary URL store partition. A client wishing to invoke the UidToUrl method on a UID u sends the request to machine M(partition(u)), where it can be serviced from the loaded secondary URL store partition. A client wishing to invoke the GetLinks method on a UID u sends the request to machine M(partition(u)), where it can be serviced from the loaded secondary forward/backward link store partition.

At step 58, k new machines are commissioned from a pool of available hot-spare machines. Desirably, hot-spare machines are standing by, on line, and can be quickly provisioned.

More particularly, at step 60, surviving replicas of the partitions that were stored on the disk (as opposed to memory) of each of the k failed machines are copied from surviving machines in the cluster to the just commissioned hot-spares, where they are stored on disk. This is possible because there are f+1 instances of each partition, so there is a surviving instance as long as no more than f machines fail at the same time. The new machines effectively take the place of the failed machines. The distributed state machine is updated to bind $x_1, x_2, \ldots, x_k$ to the names or IP addresses of the new machines.

Once the hot-spares have been configured to contain the same state as the failed machines did, at step 62, the machines in the cluster and the clients are notified of this fact. Clients abort (and later restart) any pending transactions. Each machine that currently has any secondary store partitions loaded into memory evicts them. The machines load their primary store partitions into memory. Service is unavailable during this step.

Service resumes in non-degraded mode at step 64. Clients restart any aborted transactions and then continue issuing new requests.

Figure 7:
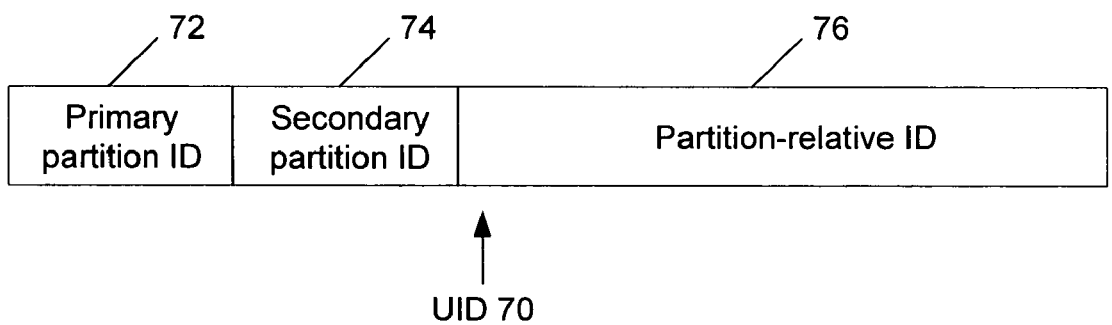
FIG. 7 is a diagram of another example UID format.

The need to abort and restart any transactions, and thus the need for clients to incorporate any transactional logic, may be avoided. Mappings may be supported from primary UID space to secondary UID space and vice versa. To this end, the format of UIDs may be modified as shown in FIG. 7.

The top few bits (portion 72) of each UID 70 encode the primary URL store partition ID containing the corresponding URL, and the next few bits (portion 74) encode the secondary URL store partition ID containing the corresponding URL. The remaining bits (portion 76) contain the partition-relative ID of the URL in either the primary or the secondary store (depending on the store where this UID came from). Herein, primary_partition(u) denotes the primary partition ID of UID u, secondary_partition(u) denotes its secondary partition ID, and relative(u) denotes its partition-relative ID. Moreover, the triple (p,s,r) may be used to denote a UID with primary partition ID p, secondary partition ID s, and partition-relative ID r.

The UIDs in a primary store 42 will have primary-partition-relative IDs, and the UIDs in a secondary store 44 will have secondary-partition-relative IDs. However, UIDs exchanged between a client and a server have primary-partition-relative IDs because they are in primary store UID space. This convention allows the client to not have to discard any UIDs that have been received prior to a failure, and to continue using these UIDs. It also means that from the client's point of view, there is exactly one UID per URL.

In order to achieve this, it is desirable to translate primary-partition-relative IDs to secondary-partition-relative IDs (to translate UIDs sent by a client to a secondary store partition) and vice versa (to translate UIDs sent back to the client). The hash functions $H_1$ and $H_2$ ensure that all the URLs from a given host end up in the same primary and secondary store partitions. Furthermore, the URL store partitions contain URLs in lexicographically sorted order, and the partition-relative IDs reflect that sort order.

As a result, primary store UIDs may be translated into secondary store UIDs, by maintaining a primary-to-secondary translation table. The table is constructed as follows. For each host (web server) h, determine the lexicographically smallest URL u such that host(u)=h, then determine the corresponding primary store UID v=(p,s,r) and secondary store UID v'=(p',s',r'), and add the tuple ((p,s,r),r') to the table. Keeping the table in sorted order (using the first element of each tuple as the sort key and standard numerical comparison as the sort relation) allows for searching the table using binary search.

In order to translate a primary store UID u to a secondary store UID, the system locates the largest UID in the primary-to-secondary translation table that is smaller or equal to u, and uses the tuple in that row of the table to adjust u to be in secondary store space, i.e., suitable to look up URLs, forward links and backward links in the secondary stores. The function PrimToSec(u) denotes the following algorithm. Given a primary store UID u=(p,s,r), find the largest UID v=(p,s,r') in the primary-to-secondary translation table that is smaller or equal to u (for example by performing binary search). Assuming v is in row (v,r"), return secondary store UID u'=(p,s,r−r'+r").

As mentioned above, a typical search corpus may contain web pages drawn from about 50 million distinct hosts, so the complete table will have about 50 million rows. However, each machine in the cluster desirably needs only those rows in the primary-to-secondary translation table where the secondary partition ID of the UID refers to the partition maintained by that machine. In other words, the table maintained by each machine will contain 1/(n−f) of the full table on average.

Mapping secondary store UIDs to primary store UIDs is done in a similar fashion. Each machine in the cluster maintains a secondary-to-primary translation table, but each machine stores the full table of about 50 million rows, not just a small fraction of it. Each row comprises a UID and partition-relative ID, like in the primary-to-secondary translation table, but the sort order of the table is changed. The sort keys are: secondary partition ID, then secondary-partition-relative ID, and then primary partition ID, for example. The "smaller or equal" relation is defined accordingly.

A function SecToPrim(u) denotes the following example process. Given a secondary store UID u=(p,s,r), find the largest UID v=(p,s,r') in the secondary-to-primary translation table that is smaller or equal to u (for example by performing binary search). Assuming v is in row (v,r"), return secondary store UID u'=(p,s,r−r'+r").

Step 56 of the degraded-mode operation may thus be modified as follows. A client wishing to invoke the UrlToUid method on a URL u sends the request to machine M($H_2$(host(u))). On that server machine, URL u is located in the loaded secondary URL store partition numbered s=$H_2$(host(u)), producing a secondary-partition-relative ID r (namely, the position of the URL in the secondary URL store partition). A primary store UID is determined by assembling a secondary store UID v=($H_1$(host(u)),$H_2$(host(u))),r) and calling SecToPrim(v), and the UID is returned to the client.

Additionally, a client wishing to invoke the UidToUrl method on a UID u sends the request to machine M(secondary_partition(u)). On that server machine, u, which is in primary store-space, is converted to a secondary store-space UID v by calling PrimToSec(u). The URL corresponding to v is located in the loaded secondary URL store partition and returned to the client.

Furthermore, a client wishing to invoke the GetLinks method on a UID u sends the request to machine M(secondary_partition(u)). On that server machine, u, which is in primary store-space, is converted to a secondary store-space UID v by calling PrimToSec(u). The UIDs $v_1, \ldots, v_z$ of the links associated with v are looked up in the loaded secondary forward/backward link store partition. Each $v_i$, which is in secondary store-space, is converted to a primary store-space UID $u_i$ by calling SecToPrim($v_i$), and the UIDs $u_1, \ldots, u_z$ are sent back to the client.

According to another aspect, the convention that clients and servers can only exchange primary store UIDs is abandoned. In this variant, clients and servers can exchange both primary store and secondary store UIDs. One of the bits of each UID is designated to indicate whether the partition-relative ID of that UID is in primary store space or secondary store space. Thus, servers do not have to map secondary store UIDs back to primary store UIDs before transmitting them to the client.

Exemplary Computing Arrangement

Figure 8:
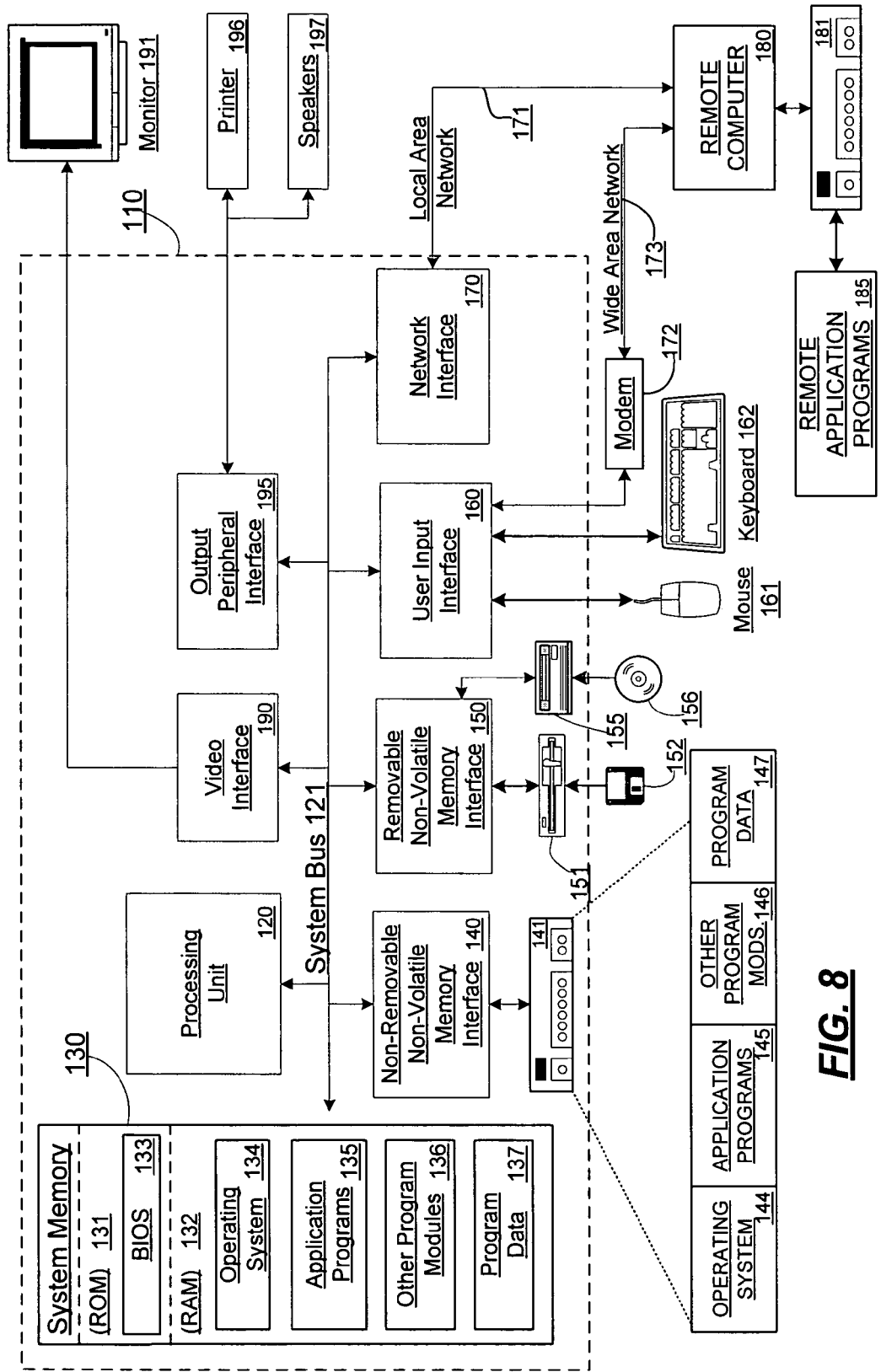
FIG. 8 is a block diagram of an example computing environment in which example embodiments and aspects may be implemented.

FIG. 8 shows an exemplary computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 8 illustrates operating system 134, application programs 135, other program modules 136, and program data 137.

The computer 110 may also include other removable/non-removable, volatile/nonvolatile computer storage media. By way of example only, FIG. 8 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 8, provide storage of computer readable instructions, data structures, program modules and other data for the computer 110. In FIG. 8, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 8. The logical connections depicted in FIG. 8 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 8 illustrates remote application programs 185 as residing on memory device 181. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A fault tolerance method for a distributed database system comprising a cluster of machines, each machine comprising a memory and a disk storage, the method comprising:
    detecting a failure of at least one machine in the cluster of machines;
    notifying surviving machines in the cluster of machines about the failure of the at least one machine;
    evicting a plurality of primary store partitions from the memory of a subset of the surviving machines;

loading at least one secondary store partition into the memory of the subset of the surviving machines from which the primary store partitions were evicted; and resuming service in a degraded mode using the at least one secondary store partition stored in the memory of the subset of the surviving machines.

2. The method of claim 1, wherein each of the primary store partitions and the secondary store partitions correspond to a uniform resource locator (URL) store, a forward link store, or a backward link store.

3. The method of claim 1, further comprising determining the subset of the surviving machines into which to load the at least one secondary store partition using a rule set.

4. The method of claim 1, further comprising:

notifying at least one client in communication with the cluster of machines about the at least one machine failure; and aborting each unfinished client transaction before resuming service in the degraded mode.

5. The method of claim 1, further comprising:

providing a spare machine to replace each of the failed machines; and copying a plurality of the replicas of the primary store partitions that resided on the at least one failed machine from the disk storage of the surviving machines to the spare machines.

6. The method of claim 5, further comprising:

evicting the secondary store partitions from the memory of the surviving machines;

loading the primary store partitions into the memory of surviving machines; and resuming service in non-degraded mode.

7. The method of claim 1, further comprising:

constructing a primary database across the cluster of machines, the primary database comprising a uniform resource locator (URL) store, a forward link store, and a backward link store;

using a first hash function to place URLs into the stores on the cluster of machines;

constructing a secondary database across a portion of the cluster of machines, the secondary database comprising a URL store, a forward link store, and a backward link store; and using a second hash function, different from the first hash function, to place URLs into the stores on the portion of the cluster of machines.

8. The method of claim 7, wherein placing the URLs into the stores on the portion of the cluster of machines using the second hash function comprises storing the hashed data in the disk storage.

9. A fault tolerance system, comprising:

a plurality of machines, each machine comprising a memory and a disk storage;

a fault detector for detecting a failure of at least one machine;

a primary database stored across the plurality of machines in the memory of the machines; and a secondary database stored across a portion of the plurality of machines in the disk storage of the machines and loaded into memory of one or more surviving machines for use when one or more machines have failed.

10. The system of claim 9, wherein the primary database comprises a uniform resource locator (URL) store, a forward link store, and a backward link store, and the secondary database across the portion of the plurality of machines comprises a URL store, a forward link store, and a backward link store.

11. The system of claim 10, wherein the primary database places URLs using a first hash function and the secondary database places URLs using a second hash function different from the first hash function.

12. The system of claim 9, wherein the portion of the machines is determined based on what number of failed machines will be tolerated.

13. The system of claim 9, wherein when a failure of at least one machine is detected, then a plurality of primary store partitions from the memory of a subset of the surviving machines is evicted, and at least one secondary store partition is loaded into the memory of the subset of the surviving machines.

14. The system of claim 13, wherein when a failure of at least one machine is detected, the system operates in a degraded mode using the secondary store partitions.

15. The system of claim 9, further comprising at least one spare machine to replace each failed machine, each spare machine comprising a plurality of the replicas of primary and secondary store partitions that resided on the at least one failed machine and is copied from the disk storage of the surviving machines.

16. The system of claim 9, wherein the primary database and the secondary database maintain a plurality of hyperlinks as unique identifiers (UIDs).

17. The system of claim 16, wherein each UID comprises a primary uniform resource locator (URL) store partition ID, a secondary URL store partition ID, and a partition-relative ID.

18. A fault tolerance system, comprising:

a plurality of machines, each machine comprising a memory and a disk storage; and a distributed database comprising a primary database and a secondary database;

wherein the primary database is stored across the plurality of machines; and wherein the secondary database is stored across a portion of the plurality of machines, and wherein the primary database and secondary database each comprise a uniform resource locator (URL) store, a forward link store, and a backward link store.

19. The system of claim 18, wherein the primary database is stored both in the memory and on the disk storage, and the secondary database is stored in the disk storage.

20. The system of claim 19, further comprising a fault detector for detecting a failure of a machine, and a spare machine to replace the failed machine, the spare machine comprising a replica of primary store partitions that resided on the failed machine and copied from the disk storage of the surviving machines.

* * * * *